April 24, 1962
K. H. CARY ET AL
3,031,591
PRESSURE MEASURING GAGE
Filed May 27, 1959
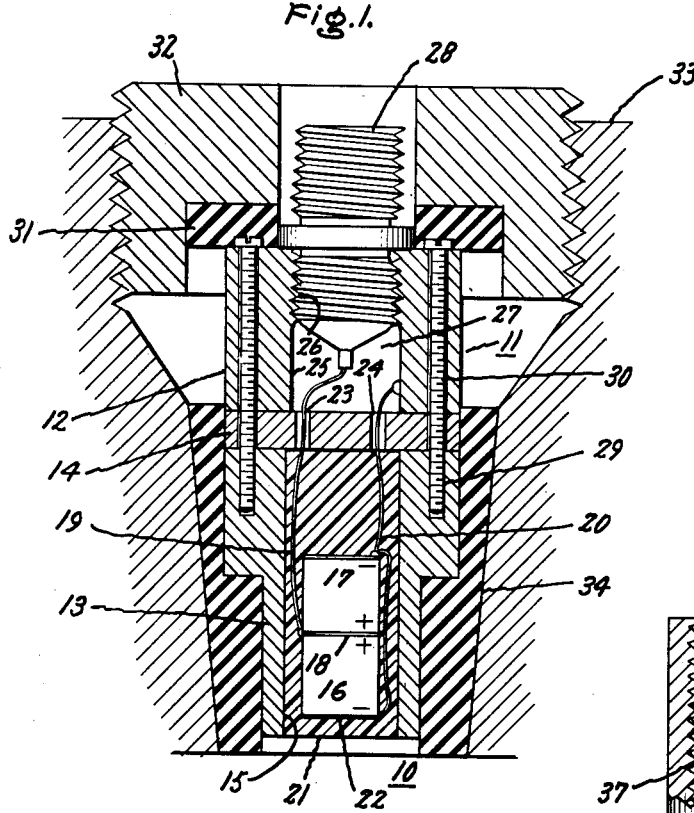
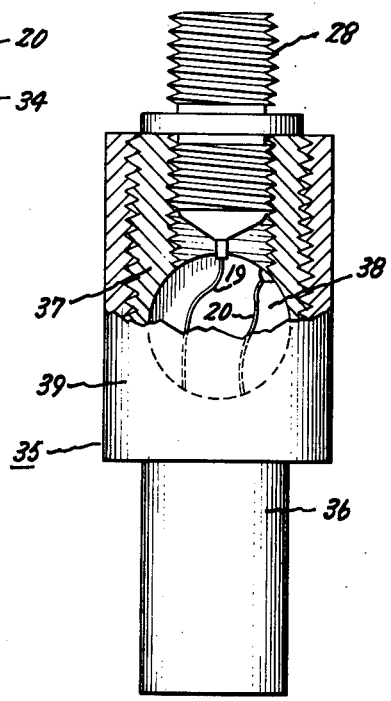
Inventors:
Kenneth H. Cary,
Henry T. Nagamatsu,
Russell E. Sheer, Jr.
by Joseph T. Cohen
Their Attorney.

United States Patent Office 3,031,591
Patented Apr. 24, 1962

3,031,591
PRESSURE MEASURING GAGE
Kenneth H. Cary, Gansevoort, Henry T. Nagamatsu, Schenectady, and Russell E. Sheer, Jr., Cohoes, N.Y., assignors to General Electric Company, a corporation of New York
Filed May 27, 1959, Ser. No. 816,305
5 Claims. (Cl. 310—8.7)

This invention relates to pressure measuring gages or instruments and more particularly to pressure measuring gages employing a piezoelectric crystal as the sensing element.

Pressure measuring gages are generally commerically available in somewhat direct reading types or gages which may sense a given pressure and translate the pressure through various mediums or mechanical movements to provide a numeral reading of the given pressure. For extremely sensitive and highly accurate gages, the crystal type has been found more satisfactory. This gage employs a crystal element, which when exposed to a force such as pressure, deflects or undergoes a change in volume and produces a small voltage proportional to its deflection or change in volume. Various apparatus in which pressures are to be measured generally require much smaller gages than are available. However, merely reducing the size of a given gage does not solve the particular problems of, less accuracy with a smaller gage, mechanical configurations, and maintenance of extreme instrument sensitivities that are required, i.e., sensitivities that favor the instrument. In crystal type gages, the crystals are usually very sensitive to heat and thus their applications are limited to those instances where the crystal is suitably insulated from heat or where measurements may be taken before increases in temperature affect the reading. Where the general sensitivity of the crystal gages are at a maximum, with respect to shock or vibration, shock mounting or other form of vibration isolation is required. Heretofore, a miniature crystal gage overcoming the above problems and still retaining high voltage output, accuracy and minimum response time, etc., has not been available.

It is, therefore, an object of this invention to provide a miniature piezoelectric crystal gage.

It is a further object of this invention to provide a miniature piezoelectric crystal gage employing a plurality of crystal elements.

It is another object of this invention to provide a miniature piezoelectric crystal pressure measuring gage having a very high instrument sensitivity with low sensitivity to heat effects.

It is yet another object of this invention to provide an extremely sensitive miniature piezoelectric pressure measuring gage incorporating vibration isolation means.

It is another object of this invention to provide a piezoelectric crystal pressure measuring gage having a high instrument sensitivity together with a high voltage output.

It is a further object of this invention to provide a piezoelectric crystal gage having a high instrument sensitivity and a high output with a minimum response period.

Briefly described, this invention in one form includes a piezoelectric crystal type pressure measuring gage utilizing as the piezoelectric crystal a pair of electrically pre-polarized crystals in disc like form which are electrically connected in parallel.

These and other features, objectives and advantages will be better understood when taken in connection with the following description and the drawings in which;

FIG. 1 is a cross sectional view of one embodiment of this invention; and

FIG. 2 is a structural modification of the embodiment of FIG. 1.

Referring now to FIG. 1, there is illustrated a preferred embodiment of my invention. In FIG. 1, the instrument or gage 10 comprises generally, a body or housing 11 of a suitably electrically conductive material or metal, such as for example stainless steel. Housing 11 includes an upper portion 12 and a lower portion 13 together with an intermediate disc portion 14. Lower portion 13 includes a cylindrical bore 15 in which crystal elements 16 and 17 are positioned.

Crystal elements 16 and 17 are of an extremely small size, more descriptively, being denoted as miniature. For example, elements 16 and 17 may range from about $\frac{1}{16}$ to about $\frac{1}{8}$ inch in diameter up to approximately $\frac{3}{16}$ inch in length. Accordingly, it is understood that the overall instrument is indeed miniature. The necessity for such small instruments is apparent, when for example, six or more pressure readings are desired to be taken from a small diameter body or thin wing profile mounted in a shock tube or on a missile. An attempt to miniaturize existing piezoelectric crystal gages leads directly to a gage of reduced sensitivity, reduced voltage output, and increased sensitivity to the deleterious effects of heat and other external affectations. A miniature gage employing the teachings of this invention may have a maximum OD of about $\frac{27}{64}$ inch. Such a gage employing a plurality of barium titanate crystal discs, for example, provides about a 40 millivolt output as compared to a commercially available gage of approximately the same size having only about a 1 millivolt output. It is readily apparent that the amplification factor is on the order of 1 to 8 indicating that far less extraneous disturbances appear in the low amplifying factor. It is to be understood that various piezoelectric crystal materials may be employed for elements 16 and 17, for example, barium titanate, strontium titanate, lead zirconate, etc. In a preferred form of this invention, elements 16 and 17 are barium titanate and a more specific material would be barium titanate with the addition of 6.1% calcium by weight.

It has been discovered that where one crystal element such as 16 or 17 is employed, the piezoelectric crystal is of such extreme heat sensitivity that accurate measurements are difficult to obtain. It is also understood that where the impulse to be measured is rather fleeting, heavy or thick insulation would affect the response time of the instrument. By employing a plurality of small discs suitably connected as hereafter described, the heat sensitivity of, for example, barium titanate is considerably reduced, thus permitting lighter insulation and providing in combination, a high sensitivity instrument with fast response time and low sensitivity to heat. However, when attempting to substitute a cylinder of the same size as a plurality of discs it was discovered that heat sensitivity remains high enough to present difficulties in the use of such an instrument. Additionally, the cylinder appears extremely sensitive to side and acceleration impulses so that direct impulse measurements become inaccurate.

Crystal elements 16 and 17 are pre-polarized as indicated by the electrical positive and negative signs thereon and are joined by an electrically conductive medium, such as, for example, a silver paste 18. Elements 16 and 17, as illustrated, are electrically connected in parallel by the joining medium 18 or alternatively, may be connected in parallel by their particular electrical leads, for example, lead 19 which connects elements 16 and 17 may be joined to each element thus eliminating the need for the conductive medium 18. The negative side of elements 16 and 17 are electrically interconnected by means of a lead 20 connecting the lower element 16 at its negative potential side and element 17 at its negative potential side. In assembly, elements 16 and 17 are positioned within the bore 15 and a suitable electrically nonconductive and heat insulating medium positioned or cast thereabout. In one example of this invention, material 21 is an epoxy casting resin and commercially available. Since it has been mentioned that many piezoelectric crystals are extremely sensitive to heat, it should be noted that the medium 21 covering the surface 22 of the crystal 16 must be thin enough in order not to interfere with proper sensitivity, but not so thin as to permit heat conductivity to be great enough to affect the measurement of the gage. When using epoxy resin, the preferred thickness is from about 1/64 to 1/32 inch, a thickness which acts as a diaphragm for pressure impulses and also as a heat insulator. The particular combination of small size together with the disc configuration, connection etc., and the encasing medium has shown no indications of shortening the response time as has been encountered when a scale reduction of an available instrument was attempted. The response time of an instrument made in accordance to the teachings of this invention has been approximately 5 to 10 microseconds as compared to a commercially available instrument of even larger size having a 40 to 50 microsecond response period.

Lower portion 13 of housing 11, and the bore 15 therein is covered by a disc member 14 which is coaxially positioned on portion 13. A pair of holes 23 and 24 are provided in disc 14 through which leads 19 and 20 extend. Upper portion 12 of housing 11 includes a bore 25 extending through one end and opening through the other by a threaded opening 26. A section of the wall or portion 12 is cut away or otherwise removed to provide an aperture 27. A well known pin or "Microdot" electrical connector 28 threadedly engages the threaded opening 26 to project into bore 25. By means of aperture 27, a suitable connection, for example soldering, may be employed to join positive lead 19 to pin connector 28. Lead 20 is electrically connected to upper portion 12 of housing 11. One particular advantage to be gained from this connecting arrangement is the elimination of lead 20 extending externally of the instrument where space is extremely limiting and soldering or joining difficult. Upper portion 12, disc 14, and lower portion 13 are provided with suitably drilled and tapped openings 29 in which screw members 30 are inserted to maintain the respective parts in engagement.

Various retaining means may be employed to maintain the gage in operating position in a wall or other member. One form of such engaging means is indicated in FIG. 1 by the combination of a suitable gasket 31 of, for example, rubber, plastic, etc., which is coaxially positioned around connector 28 and on portion 12. Thereafter, a back up type nut 32 is coaxially positioned about connector 28 and on gasket 31 and portion 12. This arrangement permits wall mounting in a deep hole in, for example, wall 33. This is merely but one of various mountings that may be employed by those skilled in the art.

In order to isolate this instrument from vibrations, a rubber or other suitable resilient material sleeve 34 is provided to encircle the lower part 13 of housing 11. Not only does this sleeve isolate the instrument and provide shock mounting characteristics, but it also permits grounding of lead 20 to the instrument body whereby the ground potential or circuit may be at some potential other than "0" ground. This arrangement eliminates the various grounding disturbances created by grounding the instrument directly to the wall of a chamber in which pressure is to be measured.

A good example of one use of this instrument is the measurement of pressure in a shock tube where the pressure rise of the passing shock wave is to be measured. In such applications, it may be necessary to mount approximately five or more of such instruments on an airfoil section having about a 5-inch diameter. It is thus understood that the instrument must be of extremely small size in order that all required connections may be made without disruption of, or interference among wires, connections and openings. Also, such an instrument must, in addition to miniature size, have a very high voltage output, extreme sensitivity, be heat resistant, and accurate over a wide range of operating parameters. Commercially available gages of this nature having the desired characteristics are extremely large, bulky and unwieldable thus limiting the number which may be suitably employed for one operation and generally lacking the desired sensitivity and accuracy.

A structural modification of this invention is illustrated in FIG. 2. Referring now to FIG. 2, there is shown an instrument or gage 35 having a one piece housing 36. Housing 36 is generally a cylindrical electrically conductive material, for example, a metal such as stainless steel. Housing 36 contains a centrally disposed bore, threaded at the upper end to receive a connector 28 and open at the lower end much in the same manner as lower portion 13 of housing 11 of FIG. 1 and for the same purpose. An intermediate portion 37 is threaded and contains an aperture 38 in which suitable connections of leads 19 and 20 may be made. A threaded sleeve 39 is positioned about the intermediate portion 37 to cover aperture 38. The remaining features of instrument 35 are similar to those of instrument 10 of FIG. 1 so that the various descriptions and advantages need not be repeated. Instrument 35 is a neater and more clean design than FIG. 1 with the additional features of ease in assembly, disassembly, connecting and somewhat smaller size.

In one example of the use of this invention, when employing this gage with an oscilloscope, a high impedance coupling device should be used. Excellent results have been obtained by using a "Kiethly Isolation Amplifier Model 102A," with amplification factors of 0.1, 1 and 10 and with a modified "Tektronix 122 Preamplifier" (input resistor changed to 100 megohms) with amplification factors of 100 and 1000.

Dynamic pressures as low as 0.001 p.s.i. and as high as 1700 p.s.i. have been measured with this type of gage.

While we have shown and described specific embodiments of my invention, we do not desire this invention to be limited to the particular constructions shown and described, as it is intended by the appended claims to cover all modifications within the spirit and scope of this invention.

What we claim as new and desire to secure by Letters Patent of the United States is:

1. A miniaturized force measuring cage capable of measuring pressure with time behind a passing shock comprising in combination, a gage body and a piezoelectric crystal element in said body exposed to deflecting forces, the said crystal element being further characterized by consisting of an even plurality of piezoelectric crystal elements polarized and connected in parallel means thermally, electrically, and vibrationally insulating said crystal element from said gage body, and a nonmetallic, sensitive, heat resistant diaphragm at one end of said body between said crystal and said deflection forces, whereby said gage is responsive to pressures on the order of 0.001 p.s.i.

2. The invention as claimed in claim 1 wherein said piezoelectric elements include an even number of piezoelectric discs pre-polarized and connected in parallel.

3. The invention as claimed in claim 1 wherein said piezoelectric elements include a pair of piezoelectric barium titanate discs with 6.1% calcium and pre-polarized and connected in parallel.

4. The invention as claimed in claim 1 wherein one side of the crystal elements is connected to the gage body as a floating ground.

5. A piezoelectric gage comprising in combination; a metal electrically conductive housing having a bore therein, a pair of barium titanate discs positioned concentrically within said bore, said discs being pre-polarized and electrically connected in parallel, a thermally and electrically non-conducting material encapsulating said discs, said encapsulating medium providing a heat resistant diaphragm for said discs, said diaphragm being at one end of said instrument and directly exposed to the pressure being measured, means connecting the negative side of said discs to said housing, means for connecting the positive side of said discs to an external instrument, a rubber material electrically nonconductive and surrounding said housing to be between the housing and a mounting wall to provide shock isolation for said gage, whereby said gage is highly insensitive to heat and shock and characterized by a response of 5–10 microseconds and the capability of measuring pressure on the order of 0.001 p.s.i.

References Cited in the file of this patent

UNITED STATES PATENTS

| | | |
|---|---|---|
| 2,068,744 | Gutzke | Jan. 26, 1937 |
| 2,096,826 | Schrader | Oct. 26, 1937 |
| 2,190,713 | Heintze | Feb. 20, 1940 |
| 2,587,304 | Fiske | Feb. 26, 1952 |
| 2,842,686 | Musser et al. | July 8, 1958 |
| 2,894,317 | Marks | July 14, 1959 |
| 2,914,686 | Clements et al. | Nov. 24, 1959 |
| 2,947,969 | Harris | Aug. 2, 1960 |